(12) United States Patent
Kurmlavage

(10) Patent No.: US 7,703,390 B2
(45) Date of Patent: Apr. 27, 2010

(54) ROLLER GRILL SEPARATING DEVICE

(75) Inventor: Michael M. Kurmlavage, Lansdowne, PA (US)

(73) Assignee: Spirit Specialty Solutions, Inc., Lansdowne, PA (US)

( * ) Notice: Subject to any disclaimer, the term of this patent is extended or adjusted under 35 U.S.C. 154(b) by 717 days.

(21) Appl. No.: 11/257,424

(22) Filed: Oct. 25, 2005

(65) Prior Publication Data

US 2006/0037486 A1    Feb. 23, 2006

Related U.S. Application Data

(60) Continuation-in-part of application No. 29/218,658, filed on Dec. 7, 2004, now Pat. No. Des. 510,879, which is a division of application No. 29/195,166, filed on Dec. 9, 2003, now Pat. No. Des. 499,346, which is a division of application No. 29/169,616, filed on Oct. 24, 2002, now Pat. No. Des. 483,278, which is a continuation-in-part of application No. 09/845,835, filed on May 1, 2001, now Pat. No. 6,474,223, which is a continuation-in-part of application No. 29/127,846, filed on Aug. 15, 2000, now Pat. No. Des. 441,307, which is a continuation of application No. 09/280,815, filed on Mar. 30, 1999, now Pat. No. 6,101,927.

(51) Int. Cl.
*A23P 1/00* (2006.01)
*G01K 1/08* (2006.01)

(52) U.S. Cl. ........................................ 99/450.4

(58) Field of Classification Search ............... 99/395, 99/538, 342–4, 450.4; 374/141–2, 208, 179–80, 374/157
See application file for complete search history.

(56) References Cited

U.S. PATENT DOCUMENTS

| | | | |
|---|---|---|---|
| 1,272,318 A | | 7/1918 | Rodgers |
| 2,344,853 A | | 3/1944 | Haes |
| 3,322,381 A | * | 5/1967 | Bubb ........................ 248/121 |
| 4,086,813 A | | 5/1978 | Meek et al. |
| 4,633,772 A | | 1/1987 | Bowden et al. |
| 5,579,969 A | * | 12/1996 | Brandell .................... 224/277 |
| 5,620,255 A | * | 4/1997 | Cook, III ................... 374/141 |
| 5,863,019 A | * | 1/1999 | Rose et al. ................ 248/205.3 |
| 6,123,013 A | | 9/2000 | Ruggiero |
| D441,307 S | | 5/2001 | Kurmlavage |

* cited by examiner

*Primary Examiner*—Shawntina Fuqua
(74) *Attorney, Agent, or Firm*—Smith Patent Office

(57) ABSTRACT

A roller grill separating device having a clip capable of being attached to a grill roller, a center section, and upper sign clips to hold supplemental signage. The center section stabilizes the device and prevents it from rotating. The center section accommodates a cross bar, a separator bar, a thermometer, and signs. A plurality of devices can be used to form a wall or the device can be used with a separator bar and a crossover bar to create a separate area on the grill so that uncooked products do not touch cooked products. One or more device can be replaced with a flavor identification device. The flavor identification device includes a slide-in signage area for sign clips that are used for identifying and marketing different types of food products such as hot dogs. The device is inexpensive to make, is sanitary and made of a heat resistant material.

20 Claims, 8 Drawing Sheets

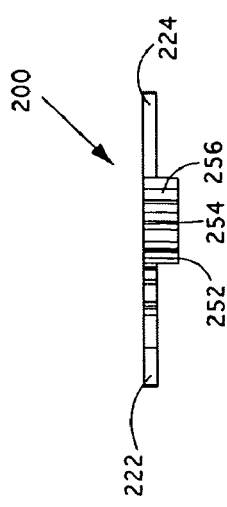
FIG. 2A
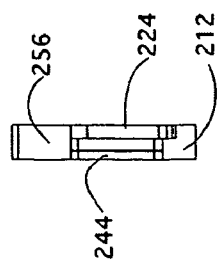
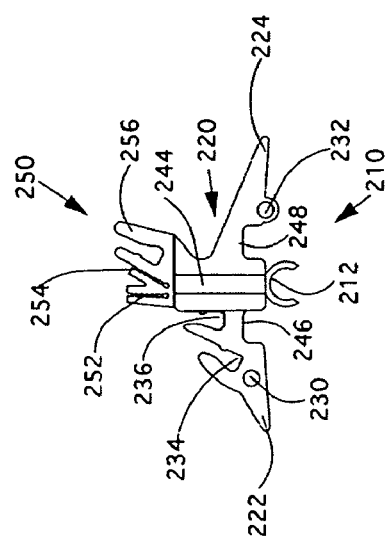
FIG. 2C
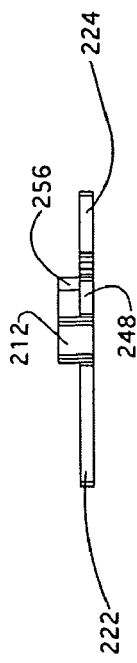
FIG. 2E
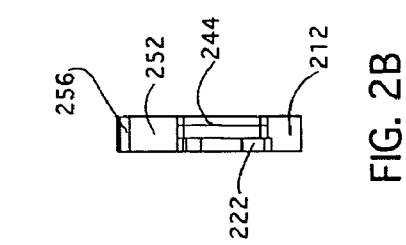
FIG. 2B

ROLLER GRILL SEPARATING DEVICE

CROSS REFERENCE TO RELATED APPLICATIONS

This application is a continuation-in-part application of U.S. Design patent application Ser. No. 29/218,658 filed on Dec. 7, 2004, which is scheduled to issue on Oct. 25, 2005 as U.S. Design Pat. No. D510,879, which is a divisional application of U.S. Design patent application Ser. No. 29/195,166 filed on Dec. 9, 2003, now U.S. Design Pat. No. D499,346, which is a divisional application of U.S. Design patent application Ser. No. 29/169,616 filed on Oct. 24, 2002, now U.S. Design Pat. No. D483,278, which is a continuation-in-part of U.S. patent application Ser. No. 09/845,835 filed on May 1, 2001, now U.S. Pat. No. 6,474,223, which is a continuation-in-part of U.S. patent application Ser. No. 29/127,846 filed on Aug. 15, 2000, now U.S. Design Pat. No. D441,307, which is a continuation of U.S. patent application Ser. No. 09/280,815 filed on Mar. 30, 1999, now U.S. Pat. No. 6,101,927. The disclosures of U.S. patent application Ser. Nos. 09/280,815, 09/845,835, 29/127,846, 29/169,616, 29/195,166 and 29/218,658 are hereby incorporated by references.

BACKGROUND OF THE INVENTION

1. Field of the Invention

This invention relates to a roller grill separating device used in conjunction with a roller grill, which assists grill operators to separate uncooked products from cooked products and provide separate cooking areas for different products.

2. Discussion of the Related Art

In this era of fast food, individuals are increasingly dependent on quick service restaurants and convenience stores for a quick meal. Beginning in the 1960's and increasing in popularity ever since, the roller grill became an efficient way to cook and store hot dogs and other products to be made readily available to consumers without being labor intensive. With the advent of roller grills, these products could be prepared without the necessity of the store clerk flipping or rolling the grilled food by hand throughout the day. The development of the gas station/convenience store made this type of food even more widely available and popular.

With more opportunities to sell more products in these numerous establishments, the industry began offering additional hot dog types of products such as sausage, a ¼ pound hot dog, spicy, mild, kielbasa, alternative meat hot dogs such as turkey, beef or soy, and others. All of these foods were still best prepared using the roller grill. Indeed, presently roller grills are still the leading hot dog cooker of choice for national convenience store chains, vending operations and cafeterias. These roller grills can be used on the front serving counter where customers serve themselves or on a back counter where a store employee takes an order from a customer and assembles and serves the food product such as a hot dog.

As noted above, the advantage of the roller grill is that the store operator does not need to continually monitor and roll the food products which frees the operator up for additional tasks. However, a problem arises in that the hot dogs can easily get ignored as the store clerk loses track of the time that each hot dog was originally placed on the grill. This problem becomes even worse with the practice of staggering hot dog placement on the grill. The employee must attempt to remember the time and flavor of each hot dog on the roller grill, and these grills are capable of cooking and holding a very large number of hot dogs. A poorly cooked hot dog can hurt or destroy a consumer's confidence in a particular eating establishment. Moreover, a hot dog which is undercooked or overcooked presents a serious health concern for the consumer, and the U.S. Department of Health has taken a strong interest in this issue.

Recent health and liability concerns have made it important to cook all foods to a predetermined temperature at a predetermined rate. This requirement by the U.S. Department of Health makes it critical that the operator keep track of how long each and every hot dog has been on the roller grill. In addition, with the many different flavors of hot dogs noted above, it is also important that the operator be able to identify the flavor of each and every hot dog on the grill.

There are products on the market for convenience stores and the like to merchandise the various hot dog flavors. These products are made of metal or plastic wire with either a plastic or metal sign area having two legs that extend through the rollers and a further perpendicular leg that passes between different rollers to support the sign. The problem with this type of grill sign is that they are not sanitary. Further, the signs take up too much space on the grill which could be used for cooking. In addition, the metal signs are hot to the touch, and therefore they cannot be moved easily and create a burning hazard to the operator. Despite the critical importance of monitoring cooking time, none of the then existing devices helped the operator keep track of cooking time or elapsed time.

These problems have been solved by the present inventor in U.S. Pat. Nos. 6,101,927 and 6,474,223. These patents illustrate a roller grill monitoring device having a clock face, a base which fits in between rollers of a grill roller, a stem for attaching the clock face to the base and a support structure attached to the stem disposed at a distance above the base so as to rest on the grill rollers. The device is inexpensive to make, is sanitary and made of a heat resistant material. The device further includes a removable signage area for sign clips that are used for identifying and marketing different types of food products such as hot dogs. Further, U.S. Pat. No. 6,474,223 illustrates the device that has openings and associated structure for accommodating at least one thermometer for monitoring the cooking temperature of the food product.

Although these inventions enabled grill operators to determine when the product is cooked, there are some problems left unsolved. In a roller grill that can cook many food products at one time, it is not always the case that one type of products are placed on the grill and removed from the grill all at once. Rather, the number of the products on the grill gradually decreases based on sale, and a grill operator keeps adding uncooked food on the grill accordingly. Therefore, cooked products and uncooked products are on the grill at the same time, and it is possible that uncooked products touch and contaminate cooked products. Without an effective grill separating device, it is hard for a grill operator to organize and manage the grill. It is also hard to identify which part is cooked and which part is uncooked, and which part is one type of products and which part is another. Also, hot dog items can move or "walk" from side to side and away from their respective sign identifier thus confusing customers and operators and making the grill look unorganized. A separator device keeps them from walking and better merchandises the grill.

There is presently no device that effectively separates cooked products from uncooked products or one kind of products from another. Moreover, there is no device that effectively separates cooking area on a grill without taking cooking space and at the same time displays marketing information and the type of food product for the operator and consumers.

SUMMARY OF THE INVENTION

An object of this invention is to provide a roller grill separating device that keeps grilled products in place and keeps uncooked products separated from cooked products on the grill so as to reduce food borne contamination liability and to maintain grill neatness at the same time.

Another object of the invention is to provide a roller grill separating device that identifies the flavor of each hot dog on the grill and can further include additional marketing information.

A still further object of the invention is to provide a roller grill separating device that is designed to fit properly on a roller grill and which can be easily relocated on the grill if the hot dogs are moved to a different area of the grill.

An additional object of the invention is to provide a roller grill separating device that is sanitary and that is cool to the touch when in use on the roller grill.

Another object of the invention is to provide a roller grill separating device that assists the operator in preparing food that has a high degree of quality control expected by consumers and by the U.S. Department of Health.

Yet another object of the invention is to provide a roller grill separating device that is easy to manufacture, utilizes a molded, one piece, high temperature, plastic body design, using sanitary, FDA approved plastic.

A still further object of the invention is to provide a roller grill separating device that easily clips onto a grill roller, takes up very little cooking space on the grill and that is sturdy enough to avoid being knocked over.

A still further object of the invention is to provide a display of what food item is being sold to take advantage of point-of-sale marketing to quickly attract the consumers.

It is a further object of the invention to monitor the inside temperature of the food product while provide signage which will adequately hold a thermometer.

An additional object of this invention is to provide a roller grill separating device that contains holes to hold a thermometer for monitoring the inside temperature of the food product.

Another object of this invention is to provide a roller grill separating device that has a sign clip to secure information panels that display point-of-sale items such as the price, specials, promotions, ingredients, new flavors, etc.

Yet another object of the invention is to provide another roller grill separating device that includes a separator bar to separate products on the grill and a crossover bar to secure a single roller grill separating device to prevent it from moving side to side.

A still further object of the invention is to provide a roller grill and roller grill separating devices in combination, wherein a plurality of the roller grill separating devices are spaced apart along the rollers of the roller grill and are joined by a plurality of separator bars and crossover bars that are disposed at right angles to each other.

A still further object of the invention is to provide another roller grill separating device that includes a plurality of roller grill separating devices and a separator to easily segment products on the grill.

Yet another object of the invention is to provide a flavor identification device that can easily clip onto a front roller or be inserted between any two rollers to display product flavor and pricing.

The above and other objects and advantages are achieved with a roller grill separating device comprising a clip capable of being attached to a grill roller, a center section being disposed on said clip, and at least one sign clip being disposed on said center section.

The above and other objects and advantages are also achieved with another roller grill separating device comprising a roller grill separating device described above and a separator bar being disposed between a base clip and an upper sign clip.

The above and other objects and advantages are also achieved with a roller grill and roller grill separating devices in combination, wherein a plurality of roller grill separating devices are spaced apart and joined by separator bars and crossover bars.

The device is designed to work on any roller grill. A nib is added to one leg so that the device can fit to a thinner roll. Precise diameter keeps roller scratching to a minimum.

The device is designed to safely segment products so that uncooked food does not contaminate cooked food and flavors of each food do not blend. It is easy to assemble the device with a separator bar and a crossover bar to create one or more separate compartment on the grill. The device neatly organizes a grill and it looks great.

The device is inexpensive to make, is dishwasher safe and sanitary, and can be made of a heat resistant material. The device can further include a signage area for identifying and marketing different types of food products. It can be easily moved around the grill and takes up very little space so as not to take up cooking area.

Other objects, features and advantages of the invention will be apparent from the following detailed description taken in conjunction with the accompanying drawings wherein preferred embodiments of the invention have been selected for exemplification and from the individual features and relationships of the respective appended claims.

BRIEF DESCRIPTION OF THE DRAWINGS

The above and other objects and features of the present invention will be clearly understood from the following description with respect to the preferred embodiments thereof when considered in conjunction with the accompanying drawings, wherein the same reference numerals have been used to denote the same or similar parts or elements, and in which:

FIG. 2A is a top plan view of a roller grill separating device according to another embodiment of the present invention;

FIG. 2B is a left side view of the roller grill separating device according to the embodiment of FIG. 2;

FIG. 2C is a front elevational view of the roller grill separating device according to the embodiment of FIG. 2;

FIG. 2D is a right side view of the roller grill separating device according to the embodiment of FIG. 2;

FIG. 2E is a bottom plan view of the roller grill separating device according to the embodiment of FIG. 2;

DETAILED DESCRIPTION OF THE PREFERRED EMBODIMENTS

Figure 1A:
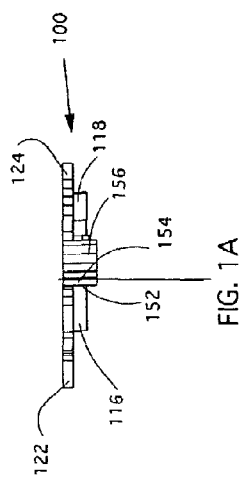
FIG. 1A is a top plan view of a roller grill separating device holding a sign according to an embodiment of the present invention.
Figure 1D:
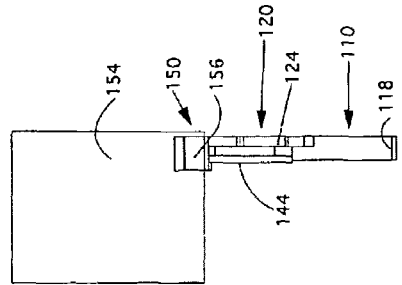
FIG. 1D is a right side view of the roller grill separating device holding a sign according to the embodiment of FIG. 1.
Figure 1C:
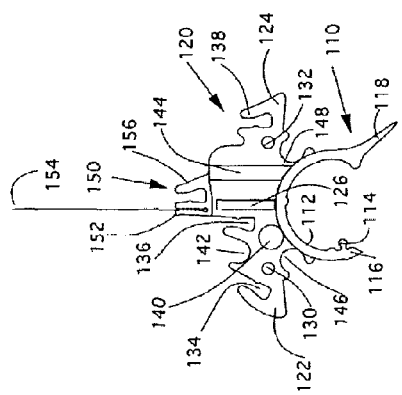
FIG. 1C is a front elevational view of the roller grill separating device holding a sign according to the embodiment of FIG. 1.
Figure 1E:
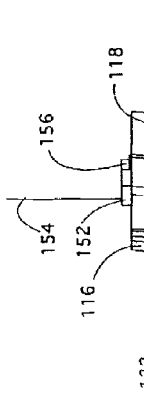
FIG. 1E is a bottom plan view of the roller grill separating device holding a sign according to the embodiment of FIG. 1.
Figure 1B:
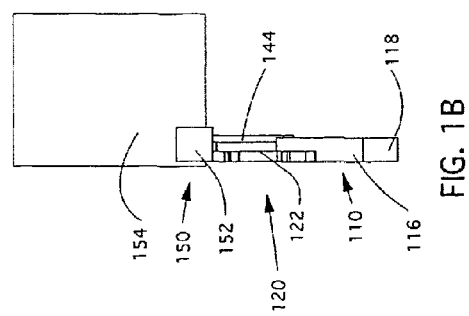
FIG. 1B is a left side view of the roller grill separating device holding a sign according to the embodiment of FIG. 1.
Figure 1F:
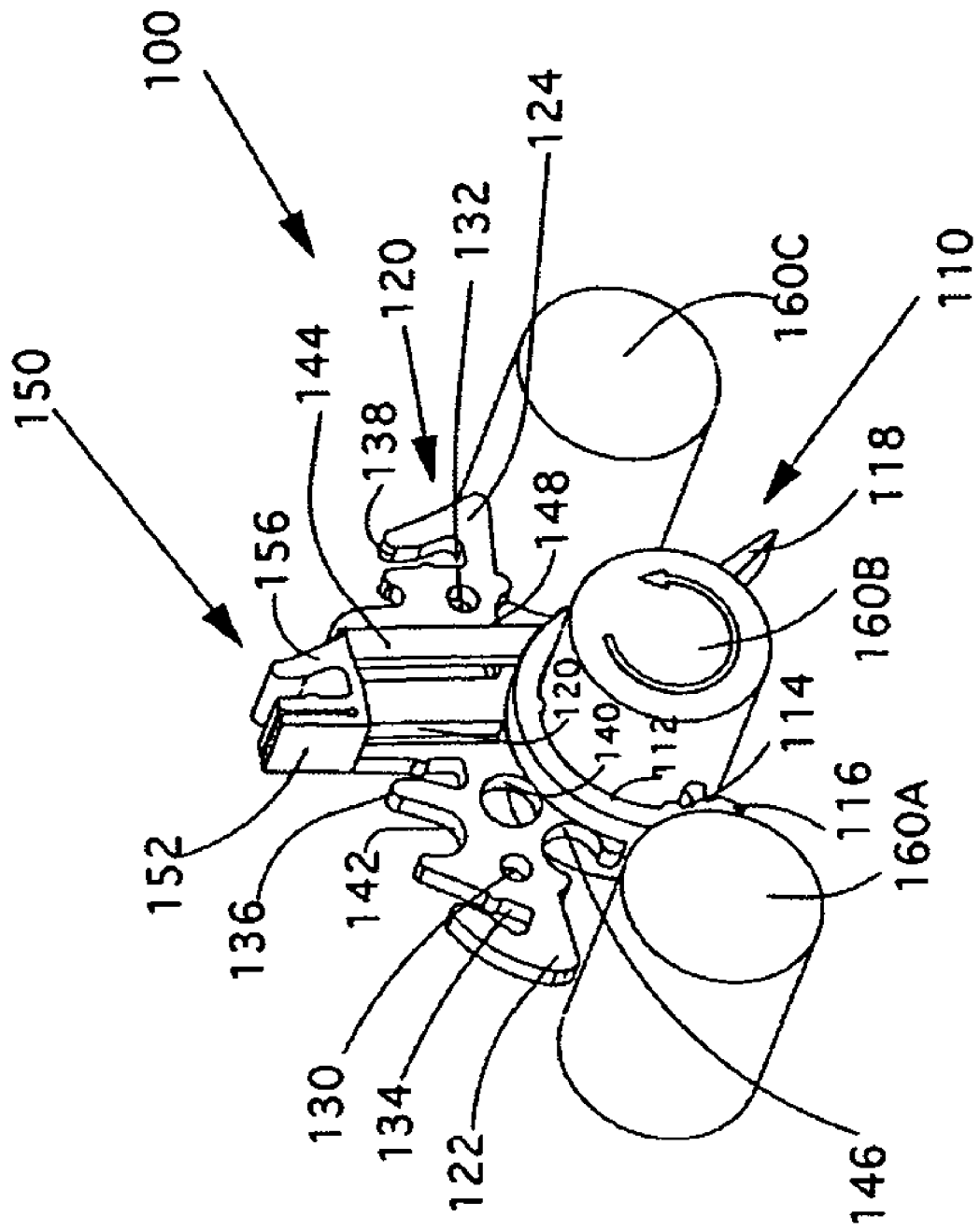
FIG. 1F is a perspective view of a roller grill separating device that is attached to a grill roller according to the embodiment of FIG. 1.

FIGS. 1A-F illustrate a roller grill separating device 100 comprising a clip 110, a center section 120, and upper sign clips 150 holding a sign 154. The clip 110 is in the shape of an arcuate clip-on member and is designed to fit onto a grill roller. Since the clip 110 is preferably made of FDA approved, heat resistant plastic, it is pliable enough to snap onto a grill roller. When correctly snapped onto place, as shown in FIG. 1F, inner circumference 112 of the clip 110 slides over a grill roller 160B. A precise inner diameter keeps roller scratching to a minimum. A projection 114 may be added to a front leg 116 to make the device 100 fit to thinner rollers. A flared portion of a rear leg 118 adds stability and keeps the device from rotating counter clockwise.

The center section 120 prevents rotation of the clip 110. In this position, the center section 120 keeps the device 100 in an upright position with ends 122, 124 resting on grill rollers 160A and 160C. The center section 120 has a rectangular cross bar hole 126, thermometer holes 130 and 132, and sign clips 134, 136 and 138. The center section 120 also has a crossover bar hole 140, a concavity section 142, a built-in separator bar accommodation slot 144, and two recessed portions 146 and 148 to accommodate a roundup grill. The center section 120 is very thin so that it does not take up room on the grill. This maximizes the area on the grill that can be used for cooking. The device 100 takes up virtually no space on the grill and adjacent hot dogs can be placed end to end very efficiently with no wasted space.

The roller grill separating device 100 also has upper sign clips 150 on the top of the center section 120. The upper sign clips 150, comprising a thinner clip 152 and a thicker clip 156, are to allow supplemental marketing point of sale items such as price tags, specials, promotions, ingredients, or new flavors to be inserted. It also allows quick response to competitive markets. Information containing materials can be attached to the separating device 100 with the sign clips 150. The thinner clip 152 has gripper teeth (non skid barbs) that can securely hold information containing materials. A clip-on sign holder like the sign clips 150 is much better than metal stands because it stays put and it does not get knocked over. Higher stands on grills that have slanted top rollers (stadium style) are not required.

As shown in FIGS. 1C and 1F, this invention discloses two thermometer holes 130 and 132 contained in the lower portion of the center section 120. The probe of a thermometer can be inserted into either one of the holes 130 and 132 so as to hold the thermometer in place. The thermometer can be of such type that the end inserted into the holes 130 and 132 can pass through the food product. Since the holes are wider than the diameter of the thermometer, the thermometer can rotate with the food product on the roller grill. This arrangement permits the thermometer to rest in one of the thermometer holes 130 and 132 so as to allow hands free and burn free food temperature monitoring. The thermometer holes 130 and 132 are for standard diameter products.

The sign clips 134, 136 and 138 are designed to accommodate rigid plastic ⅛" thick signs. The sign clips 134, 136 and 138 hold supplemental marketing point of sale items such as price tags, specials, promotions, ingredients, or new flavors.

The roller grill separating devices 100 can be used as free standing separators. For example, a plurality of separating devices 100 can be used to create a perpendicular wall on the grill by clipping the devices 100 onto every other roller in a straight line. In such case, there is a small chance that the separating devices 100 may move from side to side across the grill.

FIGS. 2A-E illustrate a roller grill separating device 200 comprising a clip 210, a center section 220, and upper sign clips 250. The clip 210 is in the shape of an arcuate clip-on member and is designed to fit onto a grill roller of a roundup type of grills. Since the clip 210 is preferably made of FDA approved, heat resistant plastic, it is pliable enough to snap onto a grill roller. When correctly snapped onto place, inner circumference 212 of the clip 210 slides over a grill roller. A precise inner diameter keeps roller scratching to a minimum.

The center section 220 prevents rotation of the clip 210. In this position, the center section 220 keeps the device 200 in an upright position with ends 222, 224 resting on grill rollers. The center section 220 has thermometer holes 230 and 232, and sign clips 234 and 236. The center section 220 also has a built-in separator bar accommodation slot 244, and two recessed portions 246 and 248. The center section 220 is very thin so that it does not take up room on the grill. This maximizes the area on the grill that can be used for cooking. The device 200 takes up virtually no space on the grill and adjacent hot dogs can be placed end to end very efficiently with no wasted space.

The roller grill separating device 200 also has upper sign clips 250 on the top of the center section 220. The upper sign clips 250, comprising thinner clips 252 and 254 and a thicker clip 256, are to allow supplemental marketing point of sale items such as price tags, specials, promotions, ingredients, or new flavors to be inserted. It also allows quick response to competitive markets. Information containing materials can be attached to the separating device 200 with the sign clips 250. The thinner clips 252 and 254 have gripper teeth (non skid barbs) that can securely hold information containing materials. A clip-on sign holder like the sign clips 250 is much better than metal stands because it stays put and it does not get knocked over. Higher stands on grills that have slanted top rollers (stadium style) are not required.

As shown in FIG. 2C, this invention discloses the two thermometer holes 230 and 232 contained in the lower portion of the center section 220. The probe of a thermometer can be inserted into either one of the holes 230 and 232 so as to hold the thermometer in place. The thermometer can be of such type that the end inserted into the holes 230 and 232 can pass through the food product. Since the holes are wider than the diameter of the thermometer, the thermometer can rotate with the food product on the roller grill. This arrangement permits the thermometer to rest in one of the thermometer holes 230 and 232 so as to allow hands free and burn free food temperature monitoring. The thermometer holes 230 and 232 are for standard diameter products.

The sign clips 234 and 236 are designed to accommodate rigid plastic ⅛" thick signs. The sign clips 234 and 236 hold supplemental marketing point of sale items such as price tags, specials, promotions, ingredients, or new flavors.

The roller grill separating devices 200 can be used as free standing separators. For example, a plurality of separating devices 200 can be used to create a perpendicular wall on the grill by clipping the devices 200 onto every other roller in a straight line. In such case, there is a small chance that the separating devices 200 may move from side to side across the grill.

Figure 3:
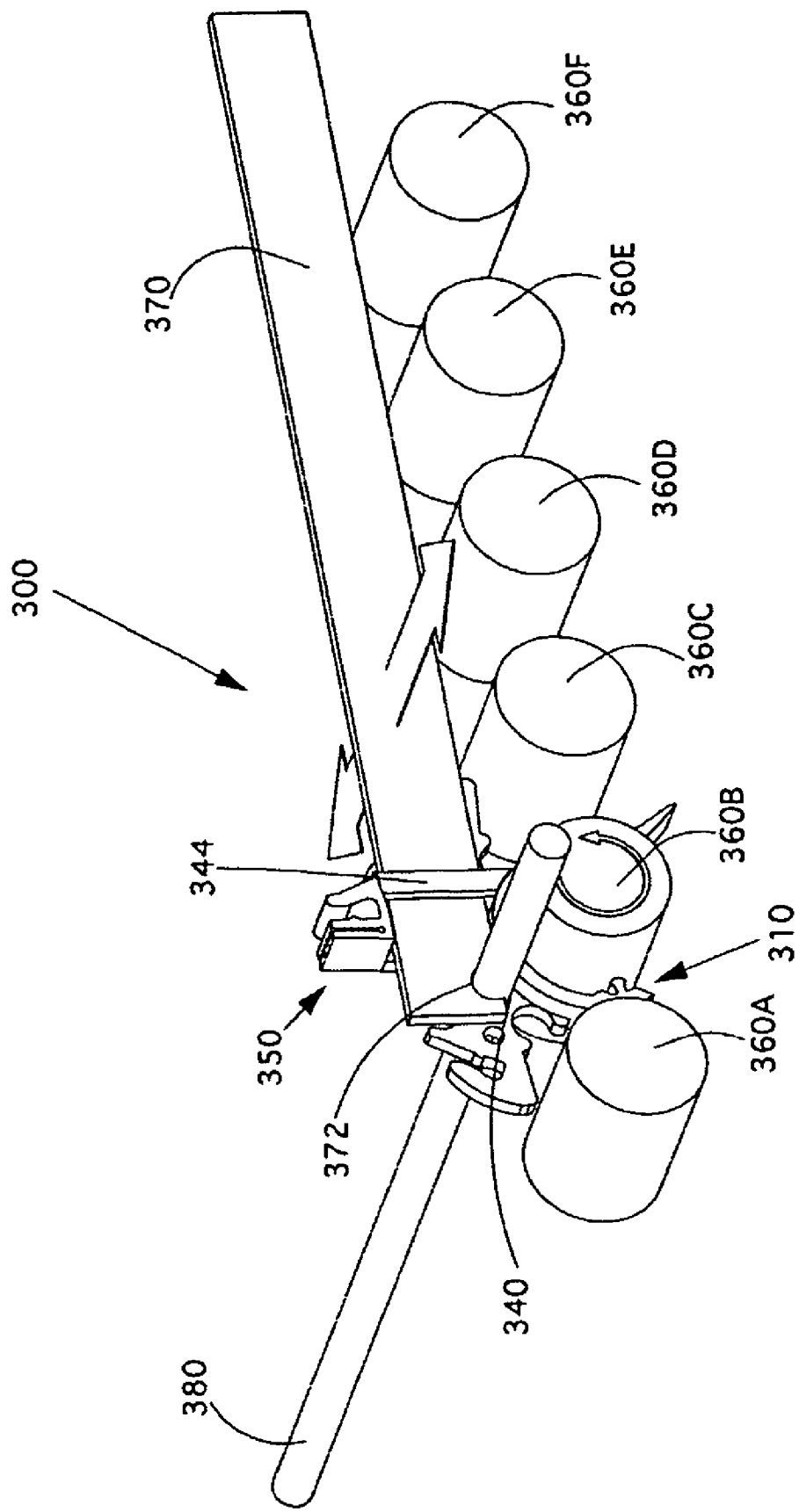
FIG. 3 is a perspective view of a roller grill separating device according to another embodiment of the invention, having the roller grill separating device according to the embodiment of FIG. 1 that is attached to a roller grill and connected to a separator bar and a crossover bar.

FIG. 3 illustrates another embodiment according to the invention of another roller grill separating device 300. The roller grill separating device 300 comprises the roller grill separating device according to the first embodiment, a separator bar 370, and a crossover bar 380. The separator bar 370 is inserted into a built-in separator bar accommodation slot 344 and stands upright between upper sign clips 350 and a clip 310 of the roller grill separating device according to the first embodiment. The separator bar 370 keeps uncooked products from touching cooked products as well as creating neat grill appearance.

The roller grill separating device according to the first embodiment and the separator bar 370 may move side to side across a grill roller 360B as indicated by the two arrows in FIG. 3. To prevent the device from moving, a downwardly extending recessed portion 372 can be made at the front end of the separator bar 370 to secure the crossover bar 380, which is inserted into a crossover bar hole 340. The crossover bar 380 can be cut to be just fit between inner walls of a stationary grill body. Thus, the crossover bar 380 prevents the separating device according to the first embodiment and the separator bar 370 from moving side to side.

Figure 4:
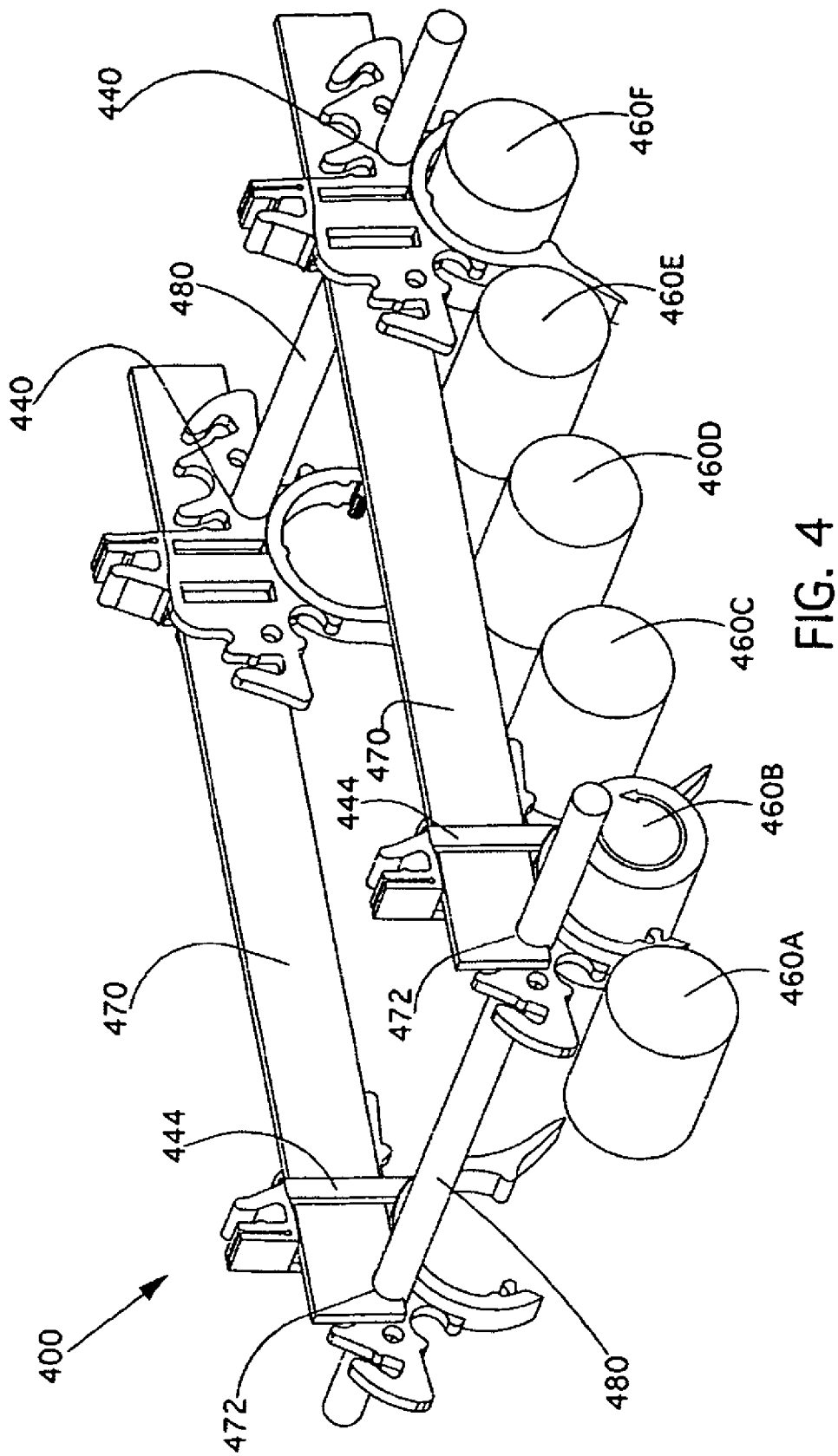
FIG. 4 is a perspective view of a roller grill separating device according to another embodiment of the invention, having a plurality of the roller grill separating devices according to the embodiment of FIG. 1 that are spaced out and joined by separator bars and crossover bars.

FIG. 4 illustrates another embodiment according to the invention of another roller grill separating device 400. The roller grill separating device 400 comprises four roller grill separating devices according to the first embodiment, two separating bars 470, and two crossover bars 480, which together create a rectangular separated area on the roller grill. As shown in FIG. 4, two of the separating devices are clipped onto grill roller 460B, and another two are clipped onto grill roller 460F. A pair of the separating devices clipped onto grill rollers 460B and 460F is connected by the separator bar 470, which is inserted into a built-in separator bar accommodation slot 444. In this embodiment, each pair is facing each other, but it is also possible to have a pair look at the same direction. The separator bars 470 have downwardly extending recessed portions 472 to secure the crossover bars 480, which are inserted into crossover bar holes 440.

The area size can be easily adjusted by moving separating devices, separator bars 470, and crossover bars 480. Also by adding more separating devices according to the first embodiment, separator bars 470, and crossover bars 480, as many separated areas can be created on a single roller grill as the number of different types of products.

Figure 5:
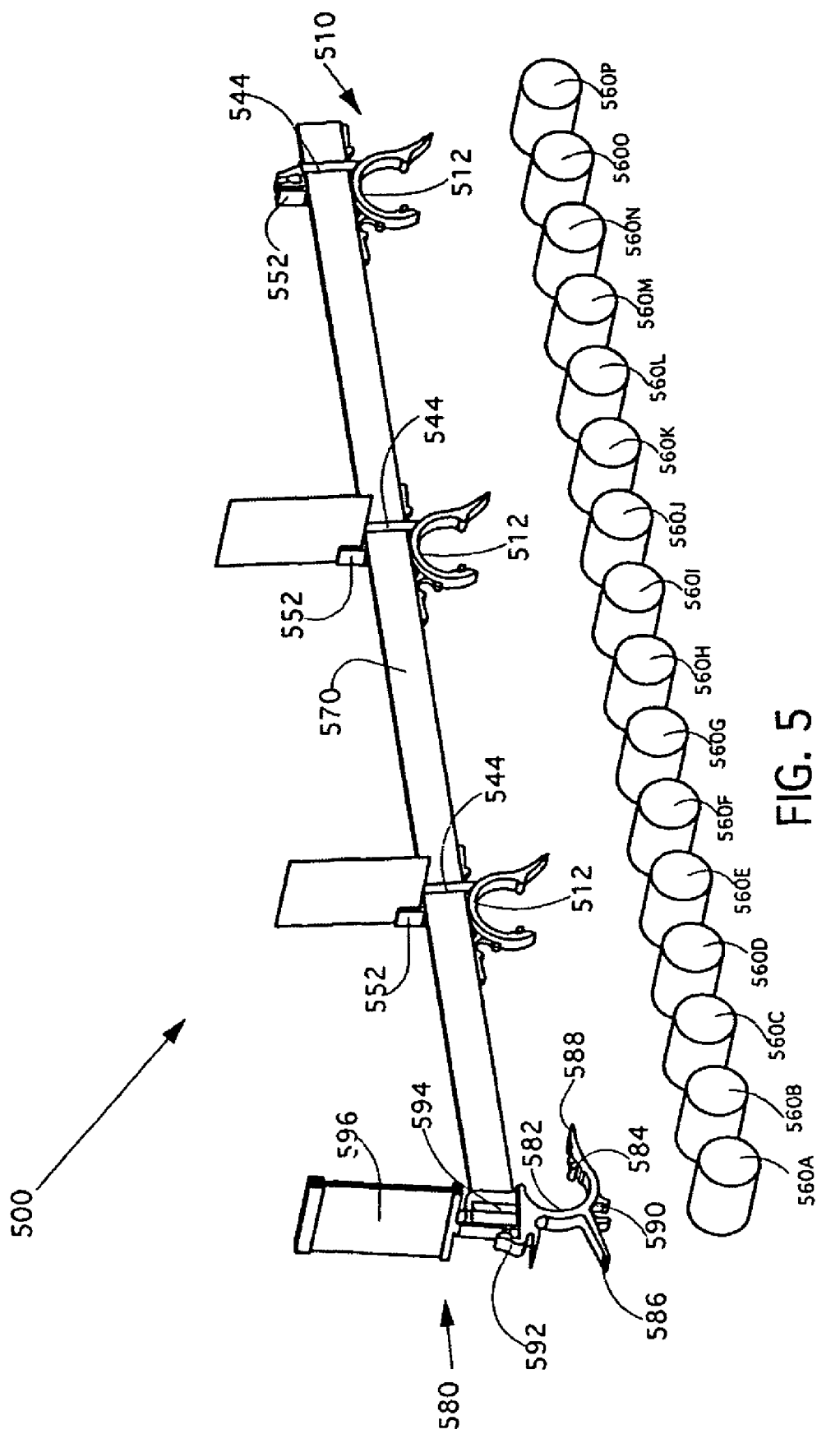
FIG. 5 is a perspective view of a roller grill separating device according to another embodiment of the invention, having a plurality of the roller grill separating devices according to the embodiment of FIG. 1 and a roller grill separating device according to another embodiment that are connected by a separator bar.

FIG. 5 illustrates another embodiment according to the invention of another roller grill separating device 500. The roller grill separating device 500 comprises a plurality of the separating devices according to the first embodiment and a separator bar 570. The separator bar 570 is used to help lock in roller grill separating devices 510 into grill rollers 560. The separator bar 570 is slid into a separator bar accommodation slots 544 of the roller grill separating devices 510. In FIG. 5, the second and third separating devices 510 are holding a sign by a thinner clip 552. The separating devices 510 can slide along the separator bar 570 to adjust to any roller configuration.

A plurality of separating devices 510 can be used to create separate areas on the roller grill. Alternatively, one or more of the devices 510, especially the first one in the row, can be replaced with a device similar to the roller grill device described in U.S. Design Pat. No. 483,278, issued on Dec. 9, 2003 and U.S. Design Pat. No. 499,346, issued on Dec. 7, 2004, invented by the applicant. In FIG. 5, the first device that attaches to the front row of the grill rollers is alternated with a flavor identification device 580. The device 580 can be placed by snapping onto the front roller or being inserted between any two rollers 560 and twisted in place. The device 580 comprises a clip and an upper portion.

The clip is in the shape of an arcuate clip-on member and is designed to fit onto a grill roller 560. Since the clip is preferably made of FDA approved, heat resistance plastic, it is pliable enough to snap onto a grill roller 560. When correctly snapped onto place, inner circumference 582 of the clip slides into a grill roller 560A. A projection 584 may be added onto the inner circumference 582 near a rear leg 588 to accommodate the device 580 to thinner rollers. A flared portion of a front leg 586 adds stability. A bottom clip 590 snaps onto the AJ Antunes (Roundup) style grills.

A front supplemental sign clip 592 is designed to accommodate rigid plastic ⅛" thick signs. The sign clip 592 holds supplemental marketing point of sale items such as price tags, specials, promotions, ingredients, or new flavors. A built-in separator bar accommodation slot 594 allows the separator bar 570 to be inserted into the built-in slot. A plastic sign card can be slid into a molded sign rail 596 to display product flavor and pricing.

Figure 6:
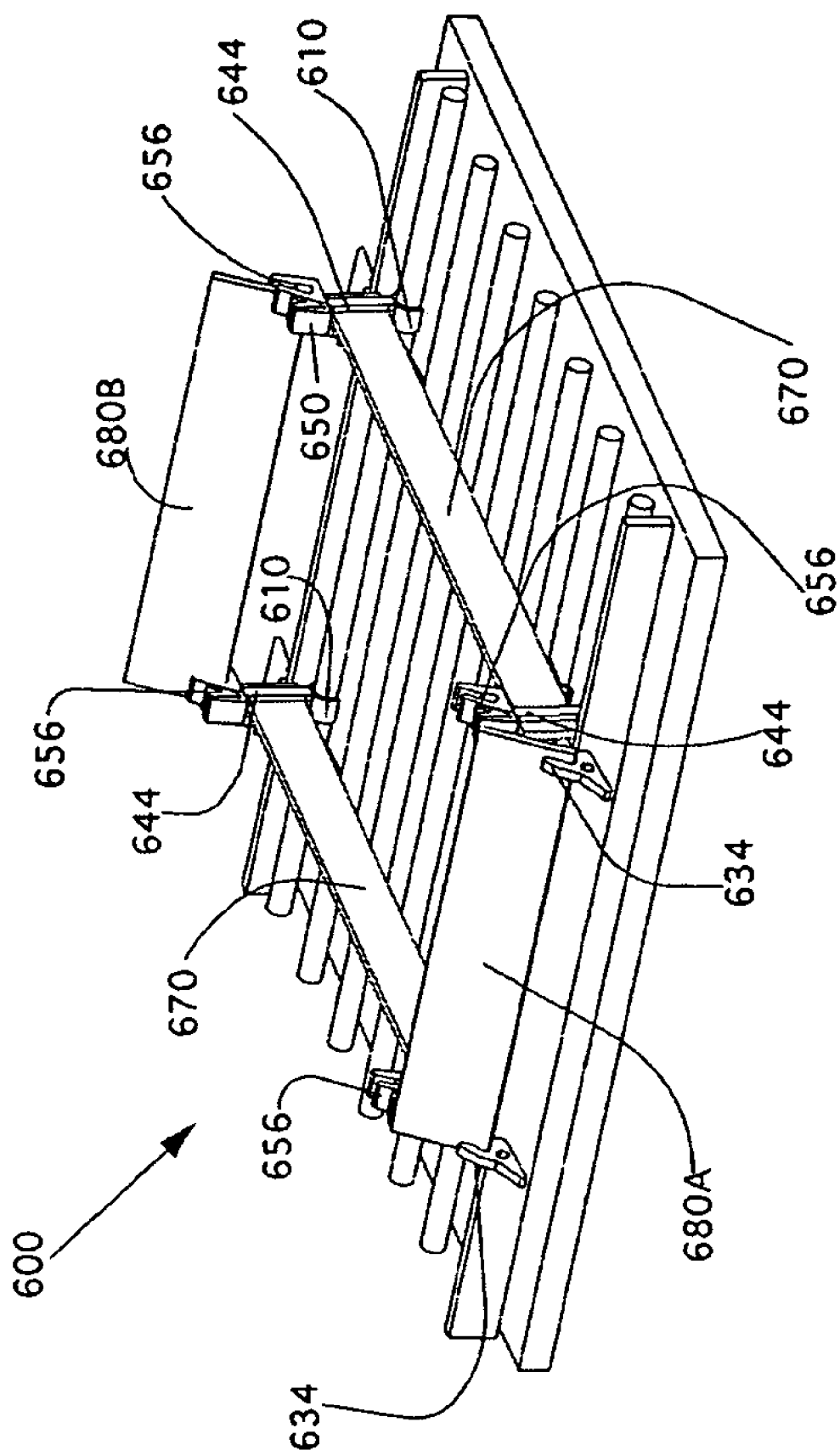
FIG. 6 is a perspective view of a roller grill separating device according to another embodiment of the invention, having a plurality of the roller grill separating devices according to the embodiment of FIG. 2 that are connected by a separator bar and flavor banners that are clipped onto the roller grill separating devices.

FIG. 6 illustrates another embodiment according to the invention of another roller grill separating device 600. The roller grill separating device 600 comprises four of the roller grill separating devices according to the second embodiment as depicted in FIGS. 2A-E, two separating bars 670, and two flavor banners 680, which creates a rectangular separated area on the roller grill. Each of the roller grill separating device according to the second embodiment is snapped onto a roundup grill by a clip 610. The separating bars 670 are slid into built-in separating bar accommodation slots 644 of the roller grill separating devices. As shown in FIG. 6, a front flavor banner 680A is fastened to a clip 634, and a rear flavor banner 680B is fastened to a thicker clip 656 of upper sign clips 650. The area size can be easily adjusted by moving separating devices and separator bars 670. Also by adding more separating devices and separator bars 670, as many separated areas can be created on a single roller grill as the number of different types of products.

Figure 7B:
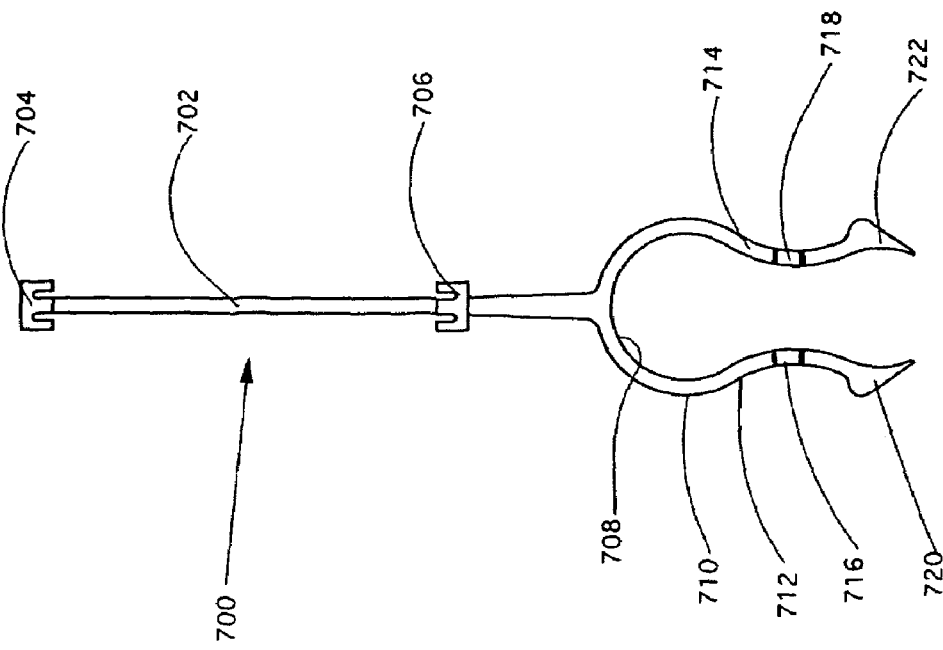
FIG. 7B is a front elevational view of the roller grill separating device according to the embodiment of FIG. 7A.

FIG. 7 illustrates another embodiment according to the invention of another roller grill separating device 700. The roller grill separating device 700 comprises an upper part 702 capable of holding a sign, a clip 710 operatively connected to the upper part 702 and capable of being attached to an individual grill roller, and a lower part operatively connected below the clip 710 and capable of being inserted between grill rollers.

The upper part 702 has an upper sign holder 704 at the top of the roller grill separating device 700 and a lower sign holder 706 substantially at a center of the roller grill separating device 700. A sign can be inserted between the upper sign holder 704 and the lower sign holder 706.

Figure 7A:
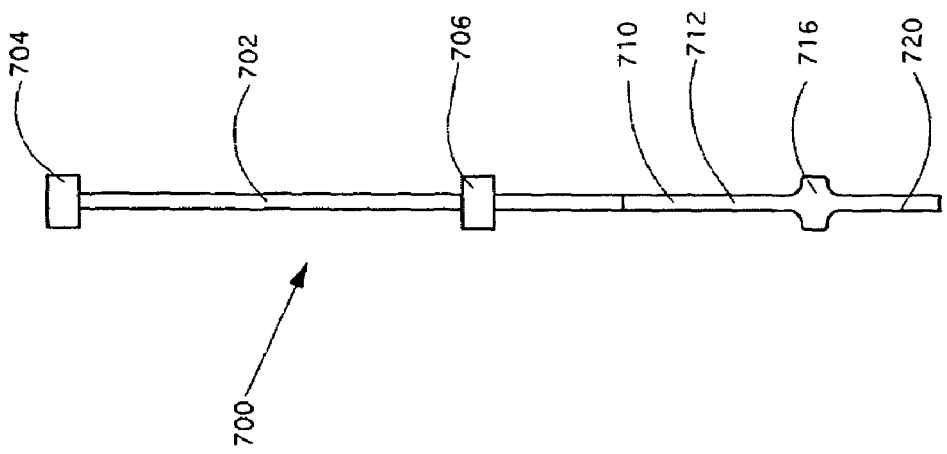
FIG. 7A is a side view of a roller grill separating device according to another embodiment of the present invention.

A lower part of the device 700 comprises a clip 710, a left hollow 712 and a right hollow 714, a left projection portion 716 and a right projection portion 718, and a left end portion 720 and a right end portion 722. As shown in FIG. 7A, the projections 716 and 718 are wider than any other parts of the roller grill separating device 700 except for the upper sign holder 704 and the lower sign holder 706.

The clip 710 can fit on a grill roller at which time an inner circumference 708 touches the grill roller. The roller grill separating device 700 can also be used by inserting the left end portion 720 and the right end portion 722 between two grill rollers so that outer surfaces of the hollows 712 and 714 touches the grill rollers. At that time, the left and right projection portions 716 and 718 maintains the roller grill separating device 700 in an upright position. Therefore, the roller grill separating device 700 can be used to fit on grill rollers in the two distinct ways.

Any suitable materials can be used to make the present invention, and methods of manufacturing are not particularly limited. It is preferable that the roller grill separating device of all the embodiments be molded from heat resistant, FDA approved plastic. The advantage of these materials, as noted above, is that the plastic material is easily molded, it can be heat stamped, it is sanitary, inexpensive and dishwasher safe.

Although the embodiments described herein are directed to use of the present separating device in conjunction with a roller grill, the invention is in no way limited thereto. In fact, the present invention can be used in any application where it is useful to separate a certain type of products from another. Some of these other applications will be described below but the description is for exemplary purposes only, and numerous other applications can be envisioned.

In supermarkets, the present invention could be used to separate different types of produce and to indicate the name of the vegetable, the price per pound and the expiration dates next to the particular items.

Anyone who had been in a fast food restaurant, knows that the pre-made food may have been sitting under the heating lamps for too long. The present invention could be used in this application so that the operators can seclude cooked products in one area so that they can add uncooked products in the remaining area.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A food separating device comprising:
   a clip capable of being attached to a rod-shaped member;
   a center section being disposed on said clip;
   at least one sign clip being disposed on said center section, wherein said separating device is made of heat resistant plastic,
   wherein said clip includes two legs capable of being disposed substantially around the rod-shaped member so as to attach said clip to the rod-shaped member; one end of a first one of said legs of said clip being flared outwardly away from the rod-shaped member when said clip is attached to the rod-shaped member and said first one of said legs has a length which is long enough to be capable of preventing said food separating device from rotating around the rod-shaped member and said first one of said legs is longer than a second one of said legs.

2. The food separating device as defined in claim 1, wherein said clip, said center section and said sign clip are integrated.

3. The food separating device as defined in claim 1, wherein said center section includes at least one sign clip capable of receiving a sign.

4. The food separating device as defined in claim 1, wherein said sign clip has gripper teeth to securely hold a sign.

5. A roller grill separating device comprising:
   a clip capable of being attached to a grill roller;
   a center section being disposed on said clip, said center section having an opening therein;
   at least one sign clip being disposed on said center section; and
   a separator bar being disposed between said clip and said sign clip,
   wherein a portion of said separator bar is disposed through the opening in said center section.

6. The roller grill separating device as defined in claim 5, wherein said separator bar includes a recess capable of contacting a portion of a crossover bar.

7. The roller grill separating device as defined in claim 5, further comprising a plurality of said roller grill separating devices connected by said separator bar.

8. The roller grill separating device as defined in claim 7, further comprising at least one roller grill device also connected to said separator bar.

9. The roller grill separating device as defined in claim 7, wherein at least one of said roller grill separating devices includes a sign disposed in said sign clip.

10. A roller grill and roller grill separating devices in combination, wherein said roller grill has a plurality of rollers and said roller grill separating devices each comprises:
    a plurality of roller grill separating devices, each of said roller grill separating devices including a clip attached to one of said rollers, a center section being disposed on said clip, and at least one sign clip being disposed on said center section;
    at least two separator bars, each of said separator bars contact at least two of said roller grill separating devices; and
    at least two crossover bars, each of said crossover bars being capable of being disposed above at least one of said rollers;
    wherein one said separator bar and one said crossover bar contact each other; and
    wherein said roller grill separating devices are spaced apart along said rollers of said roller grill.

11. The roller grill and roller grill separating devices in combination as defined in claim 10, wherein said separator bar and said crossover bar are disposed at right angles to each other.

12. A roller grill separating device comprising:
    an upper part capable of holding a sign; and
    a clip operatively connected to said upper part, said clip being capable of being attached to an individual grill roller in a first position, wherein said clip includes a lower part which extends outwardly and which is capable of being inserted between said individual grill roller and an adjacent grill roller in a second position.

13. The roller grill separating device as defined in claim 12, wherein said lower part has a projection portion having a thickness greater than any other portion of said lower part.

14. The roller grill separating device as defined in claim 12, wherein said lower part has an outwardly extending end portion, whereby said end portion is disposed underneath at least one of the grill rollers so that said roller grill separating device is maintained in an upright position.

15. A food separating device comprising:
a clip capable of being attached to a rod-shaped member;
a center section being disposed on said clip; and
at least one sign clip being disposed on said center section, wherein said clip includes one end which has a nib extending inwardly toward the rod-shaped member to make said device fit to a thinner rod-shaped member.

16. A food separating device comprising:
a clip capable of being attached to a rod-shaped member;
a center section being disposed on said clip and said center section including at least one opening therein;
at least one sign clip being disposed on said center section; and
a crossover bar extending through said opening in said center section.

17. A food separating device comprising:
a clip capable of being attached to a rod-shaped member;
a center section being disposed on said clip and said center section including at least one opening therein;
at least one sign clip being disposed on said center section; and
a thermometer extending through said opening in said center section.

18. A food separating device comprising:
a clip capable of being attached to a rod-shaped member;
a center section being disposed on said clip and said center section including at least one opening therein;
at least one sign clip being disposed on said center section; and
a separator bar extending through said opening in said center section.

19. A roller grill separating system comprising:
a plurality of roller grill separating devices, each of said roller grill separating devices including a clip capable of attaching to a grill roller, a center section being disposed on said clip, and at least one sign clip being disposed on said center section;
at least two separator bars, each of said separator bars contact at least two of said roller grill separating devices; and
at least two crossover bars, each of said crossover bars being capable of being disposed above at least one grill roller, and each of said crossover bars contact at least two of said roller grill separating devices.

20. The roller grill and roller grill separating devices in combination as defined in claim 19, wherein said separator bar and said crossover bar are disposed at right angles to each other.

* * * * *